Jan. 14, 1969  A. P. BARTHOLOMEW, JR  3,422,353
ELECTRIC METER HAVING DUAL SENSITIVITY PROVIDED
BY PLURAL BIASING MEANS
Filed Sept. 11, 1964  Sheet 1 of 4
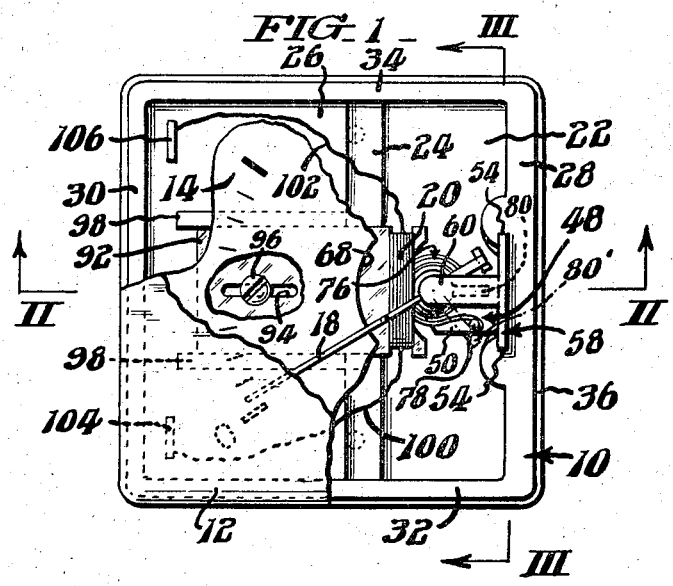
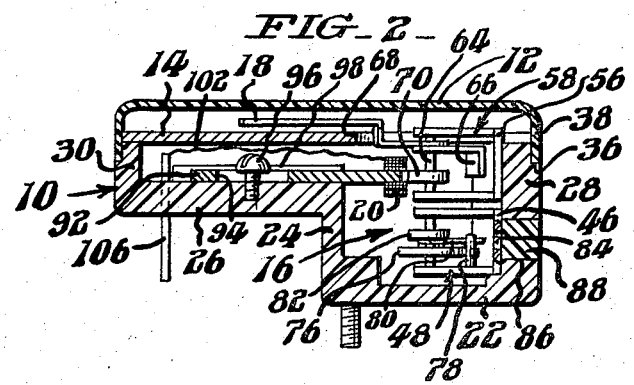
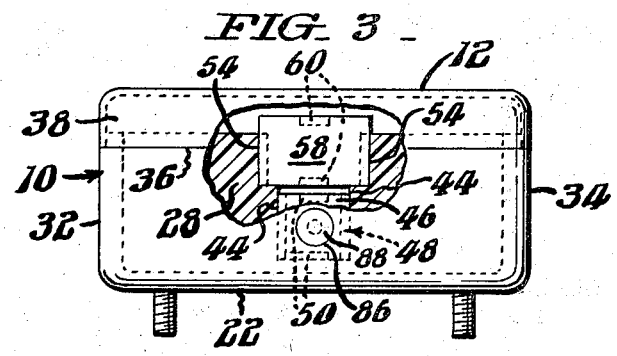
INVENTOR.
Albert P. Bartholomew, Jr.
BY
Paul & Paul
ATTORNEYS.

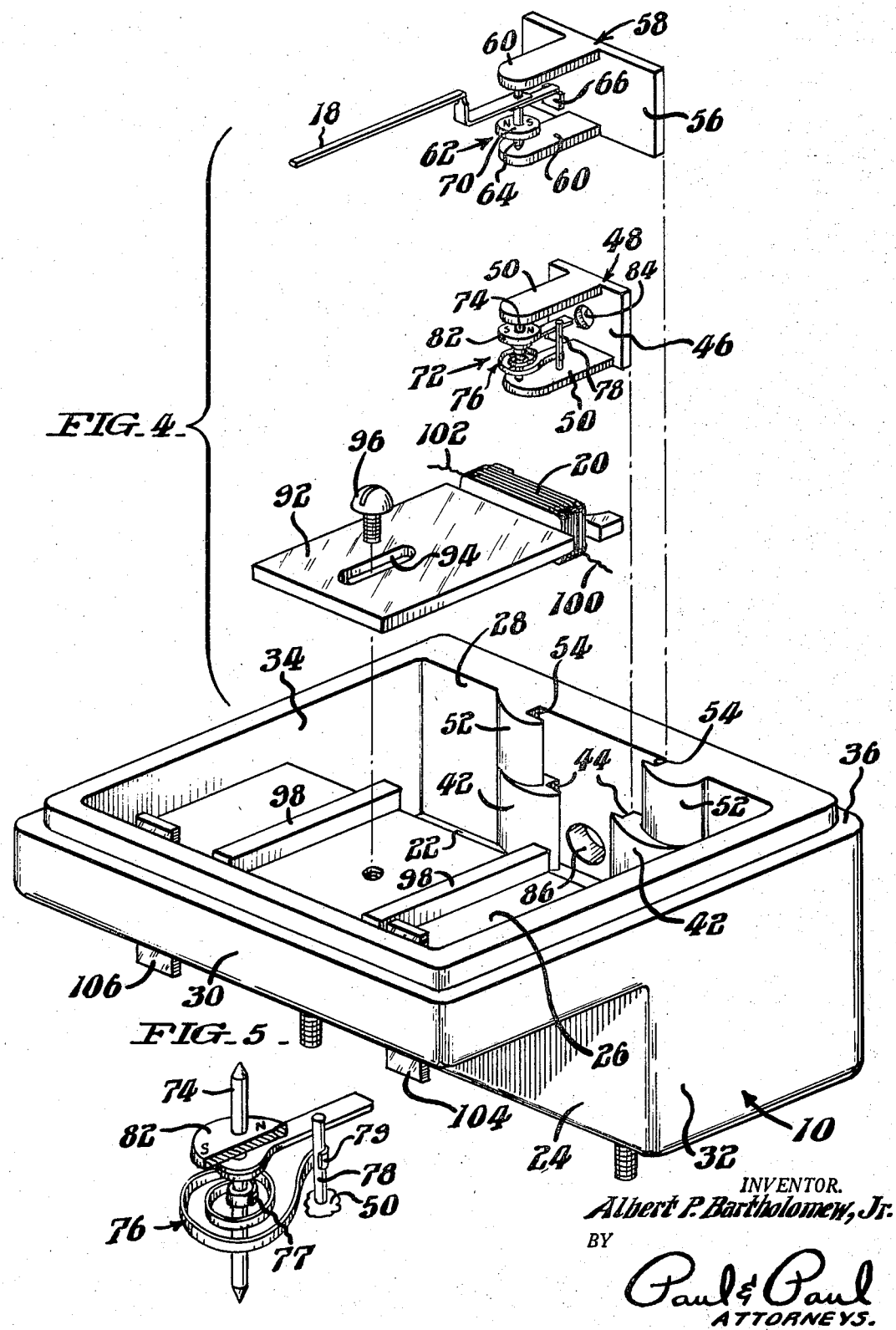

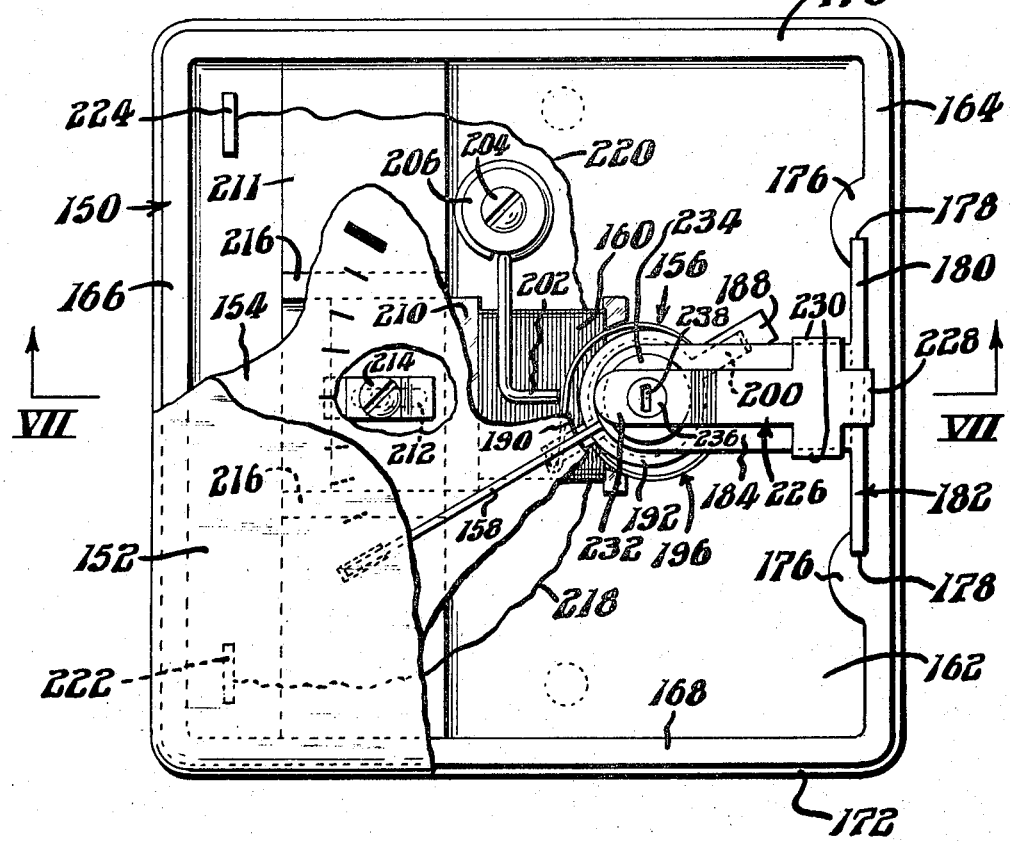
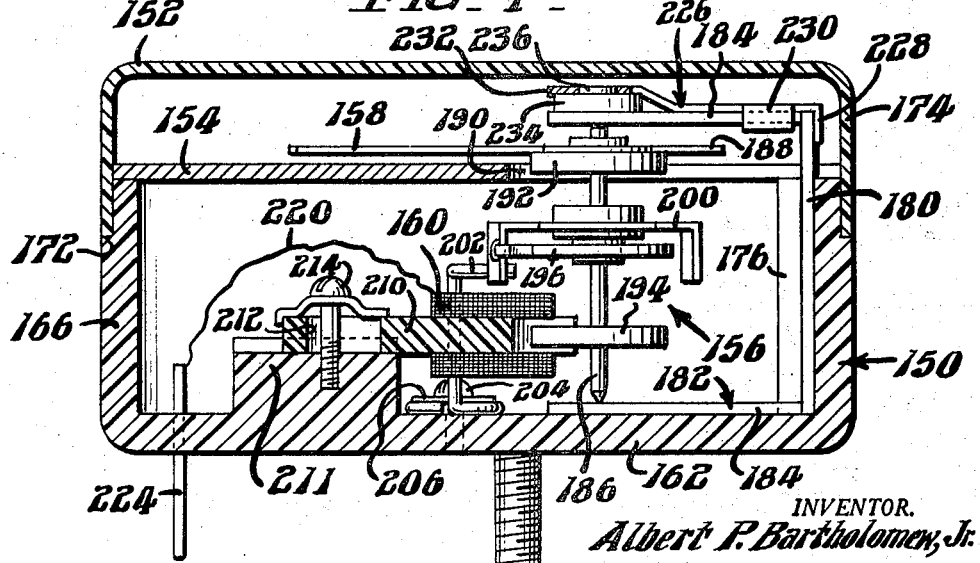

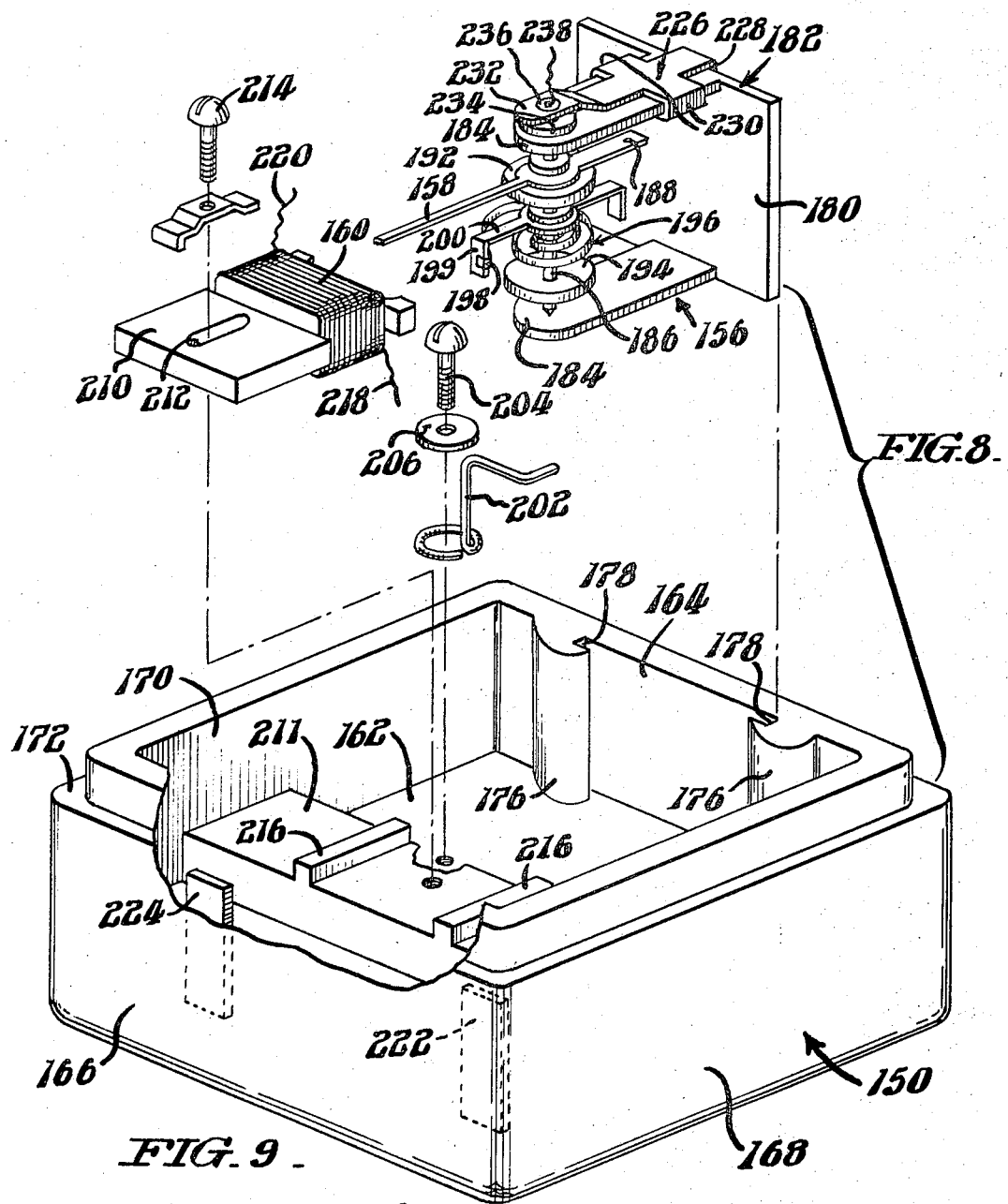
FIG. 8.
FIG. 9.
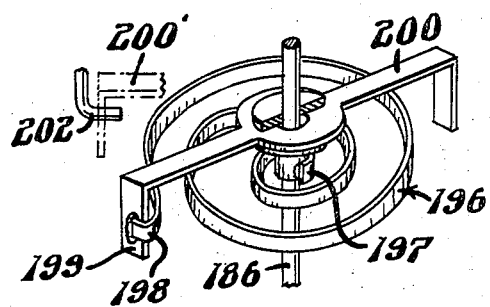
INVENTOR.
*Albert P. Bartholomew, Jr.*
BY
*Paul & Paul*
ATTORNEYS.

United States Patent Office 3,422,353
Patented Jan. 14, 1969

3,422,353
ELECTRIC METER HAVING DUAL SENSITIVITY PROVIDED BY PLURAL BIASING MEANS
Albert P. Bartholomew, Jr., Allentown, Pa., assignor, by mesne assignments, to Electro-Mechanical Instrument Company, Inc., a corporation of Pennsylvania, organized Oct. 13, 1967
Filed Sept. 11, 1964, Ser. No. 395,960
U.S. Cl. 324—146                    13 Claims
Int. Cl. G01r 1/20

ABSTRACT OF THE DISCLOSURE

The invention relates to an electric measuring instrument with different sensitivity ranges. The different ranges are effected by providing the permanent magnet meter rotor with plural successively acting biasing means. Such biasing means may take the form of permanent magnet and hairspring biasing arrangements.

---

This invention relates generally to electric meters and particularly to such meters having both high and low sensitivity ranges.

An important object of the invention is to provide a dual sensitivity meter having a wide range and a definite point of sensitivity change.

Another object is to provide such a meter which is astatic.

Another object is to provide such a meter having a pointer which moves upscale in one direction only, first through a high sensitivity range and then through a low sensitivity range.

Another object is to provide such a meter having a pointer which moves upscale in one direction from an initial position through a high sensitivity range when coil current flows and upscale in the opposite direction from said initial position through a low sensitivity range when coil current is reversed.

Other objects of the invention will become apparent when the following specification is read with reference to the accompanying drawings, in which:

FIGURE 1 is a plan view of a meter constructed in accordance with the invention, with parts of the bezel and dial face broken away to expose the interior of the meter;

FIGURE 2 is a section on line II—II in FIGURE 1;

FIGURE 3 is a side elevation and part section on line III—III in FIGURE 1;

FIGURE 4 is an enlarged exploded perspective view of the meter shown in FIGURES 1 to 3;

FIGURE 5 is an enlarged perspective view of an auxiliary movement of the meter;

FIGURE 6 is a plan view of a modified form of the meter constructed in accordance with the invention, with parts of the bezel and dial face broken away to expose the interior of the meter;

FIGURE 7 is a section on line VII—VII in FIGURE 6;

FIGURE 8 is an exploded perspective view of the meter shown in FIGURES 6 and 7; and FIGURE 9 is an enlarged perspective view of a hairspring mounting.

The following description is directed to the specific forms of the invention shown in the accompanying drawings and is not addressed to the scope of the invention, which may be practiced in a variety of forms.

Referring to the embodiment of the invention shown in FIGURES 1 to 5, the casing generally designated 10, is molded of suitable plastic material and covered with a bezel 12 which overlies a dial face 14. The casing 10 houses movement means, generally designated 16, which mounts a pointer 18 that sweeps over the dial face 14. Associated with the movement means 16 is a wire coil 20.

Referring particularly to FIGURES 2 and 4, the casing 10 comprises a bottom wall area 22 from which there extends upwardly a wall area 24 connecting the wall area 22 with a bottom wall area 26. Extending about the casing are upright side wall areas 28, 30, 32 and 34. These side wall areas are provided with a peripherally extending recess 36 which receives a flange 38 depending from the bezel 12.

Referring particularly to FIGURES 1 to 4, formed integrally with the wall area 28 are a pair of formations 42 laterally spaced and provided with opposed recesses 44. Opposite side marginal portions of the base 46 of a U-shaped bracket 48 are received respectively by the recesses 44, the base 46 being thereby disposed next to the wall area 28. The bracket 48 is provided with a pair of vertically spaced legs 50. Above the formations 42 respectively are a pair of formations 52 provided with opposed recesses 54. Opposite side marginal portions of the base 56 of a U-shaped bracket 58 are received respectively by the recesses 54. The bracket 58 is provided with a pair of vertically spaced legs 60. The brackets 48 and 58, made of non-magnetizable sheet metal, may be secured in position by any suitable means, for example, by being glued.

The bracket 58 carries a principal movement section 62 comprising an arbor 64 opposite end portions of which are tapered and journaled respectively in the bracket legs 60. The arbor 64 mounts the pointer 18 and a counterbalance 66. The pointer 18 extends through an opening 68 in the dial face 14. The arbor 64 also mounts a permanent magnet disc 70. The bracket 48 carries an auxiliary movement section 72 comprising an arbor 74 opposite end portions of which are tapered and journaled respectively in the bracket legs 50. The arbor 74 mounts a relaxed hairspring 76 having an inner end portion 77 anchored to the arbor and an outer end portion 79 anchored to a stop 78 carried by a leg 50 of the bracket 48, as shown. The arbor 74 also mounts a permanent magnet disc 82. The base 46 of the bracket 48 is provided with an opening 84, which is aligned with an opening 86 in the wall area 28. The opening 86 receives a plug 88.

A hollow wire coil 20 is wound about one end of a form 92, which is seated upon the wall area 26 and secured thereto by means of a screw 96 projected freely through an elongated slot 94 in the form and threaded into the wall area 26. The form fits neatly between two formations 98 formed integrally with the wall area 26. Opposite end portions of the coil, designated 100 and 102, are connected respectively with a pair of electric terminals 104 and 106.

The permanent magnets 70 and 82 are magnetized in known manner to make the movement as a whole astatic. The mutual attraction between permanent magnets 70 and 82, i.e., the strength of the magnetic coupling is materially greater than the torque of which the hairspring is capable.

When the terminals 104 and 106 are connected to a source of electric current, flux incident to coil current reacts with permanent magnet 70, thereby driving pointer 18 upscale against the influence of hairspring 76. During initial current flow, the arbors 64 and 74 turn in unison due to the magnetic coupling. When the pointer 18 reaches a predetermined upscale position, the arm 80 engages the stop 78, whereupon the arbor 74 is arrested and held against further turning movement in the upscale direction. If the flow of current continues to increase, the coil flux increases and reacts more strongly with the permanent magnet 70 until the pointer 18 is driven further upscale against the influence of the magnetic coupling. When the flow of current is terminated, the pointer 18 first moves back downscale under the influence of the magnetic coupling to the predetermined intermediate upscale position, then, through the magnetic coupling, it moves from this intermediate position to its initial position under the influence of the hairspring 76.

Since the magnetic coupling effect is greater than the hairspring torque, it will be obvious that in moving from its initial position to the intermediate upscale position, the meter is more sensitive than when moving from the intermediate position to the extreme upscale position, i.e., in moving upscale more coil current per degree of pointer deflection is required after the pointer passes the intermediate upscale position. Thus a meter having dual sensitivity is provided. In addition, it will be noted that the meter has a definite point of sensitivity change.

Calibration of the high sensitivity range is effected by moving coil 20 closer to or farther away from the magnet 70, and calibration of the low sensitivity range is effected by moving the bracket 48 closer to or farther away from the bracket 58 whereby to vary the distance between the magnets 70 and 82 as may be required. As indicated hereinabove, when the pointer 18 is in its initial position, the hairspring 76 is relaxed. The pointer is zeroed by adjusting the hairspring.

The meter illustrated in FIGURES 1 to 5 may be modified to locate the zero position intermediate the extreme positions of the pointer, with the high sensitivity range on one side of the zero position and the low sensitivity range on the opposite side of the zero position. It is merely necessary to position the arm 80 adjacent the stop 78, as shown by broken lines in FIGURE 1 at 80'.

Flux incident to coil current reacts with permanent magnet 70, thereby driving pointer 18 upscale in a direction against the influence of hairspring 76. The arm 80' swings away from the stop 78. When current flow is terminated, or when it is reversed in direction, the pointer swings back to its initial position under the influence of hairspring 76, the arm 80' reengaging the stop 78 and being arrested thereby. Thus the arbor 74 is held against further turning movement. If current in the reverse direction now increases, the pointer moves upscale in the opposite direction against the influence of the magnetic coupling. When flow of current is terminated, the pointer returns to its initial position under the influence of the magnetic coupling.

Obviously, such a meter is more sensitive when current flows in one direction than it is when current flows in the opposite direction.

In lieu of the hairspring 76, a permanent magnet (not shown) for control may be mounted upon the underside of the lower leg 50 of the bracket 48. The control magnet is mounted in alignment with the arbors 64 and 74 so as to be adjustably fixed. Calibration of the high sensitivity range is effected by demagnetizing the control magnet as may be required, and calibration of the low sensitivity range is effected by varying the distance between the magnets 70 and 82 as may be required. In addition, the meter may be made with zero at one extreme position of the pointer or at a point intermediate the extreme positions of the pointer.

Referring particularly to the embodiment of the invention shown in FIGURES 6 to 9, the casing, generally designated 150, is molded of suitable plastic material and covered with a bezel 152 which overlies a dial face 154. The casing houses a movement 156 which mounts a pointer 158 that sweeps over the dial face. Associated with the movement 156 is a wire coil 160.

Referring particularly to FIGURE 8, the casing 150 is provided with a bottom wall 162 about the periphery of which extend upright side wall areas 164, 166, 168 and 170. Extending about the top of these wall areas is a recess 172 which receives a flange 174 depending from the bezel 152.

Referring particularly to FIGURES 6 to 8, formed integral with the wall area 164 are a pair of laterally spaced formations 176 provided with opposed recesses 178 adjacent to the wall 164. Opposite side marginal portions of the base 180 of a U-shaped bracket 182 made of non-magnetizable sheet metal are received by the recesses 178, the base 180 being thereby disposed next to the wall area 164. The bracket 182 is provided with vertically spaced legs 184. The bracket 182 is secured in position by any suitable means, for example, by glue.

The bracket 182 mounts the movement 156. The arbor 186 of the movement has opposite end tapered portions journaled in the legs 184 of the bracket 182. The arbor carries the pointer 158 which extends through an opening 190 in the dial face, and which is provided with a counterbalance 188. The arbor also carries a pair of permanent magnet discs 192 and 194 and a hairspring 196. The inner end portion 197 of the hairspring 196 is affixed to the arbor, while the outer end portion 198 of the hairspring is affixed to an outer end portion 199 of an arm 200, which may turn freely about the arbor 186. Affixed to the casing is a stop 202 secured by means of a screw 204 extending freely through a washer 206 and threaded into the casing.

Associated with the permanent magnet disc 194 is a hollow wire coil 160 mounted upon a form 210 seated upon a raised portion 211 of the bottom wall 162. The form 210 is provided with an elongated slot 212 through which extends a screw 214 threaded into the raised part 211 of the wall 162. The form 210 is fitted between a pair of formations 216. Opposite end portions of the wire coil, designated 218 and 220, are connected respectively with electric terminals 222 and 224.

Affixed to the upper leg 184 of the bracket 182 is a clip 226 made of non-magnetizable sheet metal. The tail end 228 of the clip is bent around the bottom of the bracket, and lateral extensions 230 are bent about the leg 184. The top of the clip is offset, as at 232, to provide a space which receives the control disc magnet 234. The disc is provided with a hub 236 fitted into an opening formed in the clip and provided with a slot 238 for receiving the end of a screwdriver.

The movement 156 is astatic, and the control magnet effect is materially less than the maximum possible hairspring torque.

When terminals 222 and 224 are connected to a source of electric current, flux incident to coil current reacts with permanent magnet 194 thereby driving pointer 158 upscale against the influence of the control magnet 234. During this initial current flow, the hairspring 196 and arm 200 turn with the arbor 186, no energy being stored in the hairspring 196. When the pointer reaches a predetermined upscale position, the arm 200 engages the stop 202, arresting the outer end portion 198 of the hairspring 196.

If the flow of current continues to increase, the coil flux increases and reacts more strongly with the permanent magnet 194, whereupon the pointer 158 is driven further upscale against the influence of both the hairspring 196 and the control magnet 234.

When the flow of current is terminated, the pointer 158 moves downscale under the influence of the hairspring 196 and the control magnet 234 to the intermediate upscale position, and then it moves from its intermediate position to its initial position under the influence of the control magnet 234. During this latter movement, the hairspring 196 and arm 200 turn with the arbor 186, the arm 200 moving away from the stop 202.

In moving upscale, since the hairspring torque is greater than the control magnet effect, more coil current per degree of pointer deflection is required after the pointer passes the intermediate upscale position. Thus a meter is provided with dual sensitivity and a definite point of sensitivity change.

Calibration of the high sensitivity and low sensitivity ranges are coordinated, i.e., demagnetizing the control magnet 234 and moving the coil 208 closer to or farther away from the arbor 186 each affect both the high sensitivity and the low sensitivity ranges. The pointer is zeroed by suitably orienting the control magnet about its axis.

The meter shown in FIGURES 6 to 9 may be made with zero intermediate the extreme positions of the pointer, and with the high sensitivity range on one side and the low sensitivity range on the opposite side of zero. It is merely necessary to position the arm 200 adjacent the stop 202, as shown by broken lines in FIGURE 9 at 200'.

Flux incident to coil current reacts with permanent magnet 194, thereby driving pointer 158 upscale in one direction against the influence of control magnet 234. The arm 200 swings away from the stop 202. When current flow is terminated, or when it is reversed in direction, the pointer 158 swings back to its initial position under the influence of the control magnet, and the arm 200 engages the stop 202. If current in the reverse direction increases, the pointer 158 moves upscale in the opposite direction against the influence of both the control magnet 234 and the hairspring 196. When flow of current is terminated, the pointer 158 returns to its initial position under the influence of the control magnet 234 and the hairspring 196. Obviously, more coil current per degree of pointer deflection is required when the pointer moves in one direction than in the other. Thus the meter has dual sensitivity.

What is claimed is:
1. In an electric measuring instrument,
a casing,
a dial face,
a pair of arbors, permanent magnets rotatably mounted on said arbors and magnetically coupling said arbors for being rocked in unison and rendering the same astatic,
a pointer mounted upon a first one of said arbors and adapted for being swung thereby over said dial face,
means yieldably biasing said pointer against movement upscale,
a coil for setting up flux incident to initial current flow therethrough and disposed for reaction of said flux with one of said magnets for driving said pointer upscale against said bias,
and stop means for terminating movement of the second one of said arbors when said pointer is driven upscale to a predetermined intermediate position, said pointer being adapted for being driven beyond said intermediate position against the mutual attraction of said magnets by the reaction of said one magnet to flux set up by said coil incident to increased current flow.

2. The electric measuring instrument defined in claim 1 wherein the biasing means includes a control element arranged to act upon the second arbor and through the magnetic coupling upon the first arbor.

3. The electric measuring instrument defined in claim 2 wherein the magnetic coupling dominates the effect of the control element.

4. The electric measuring instrument defined in claim 3 wherein when flow of current is terminated the pointer moves downscale to its intermediate position under the influence of the magnetic coupling and from said intermediate position to its initial position under the influence of the control element.

5. The electric measuring instrument defined in claim 1 wherein the stop means includes an element carried by the second arbor and adapted for engagement with a stationary abutment when the pointer reaches its intermediate position.

6. The electric measuring instrument defined in claim 1 wherein the arbors are mounted separately respectively in a pair of brackets and thereby positioned in coaxial relation, and the brackets are affixed to said casing with said magnets a selected distance apart whereby to effect a magnetic coupling of predetermined strength.

7. In an electric measuring instrument,
a casing,
a dial face,
a rockably mounted arbor, permanent magnet discs mounted upon said arbor and rendering the same astatic,
a pointer mounted upon said arbor and adapted for being swung thereby over said dial face,
control magnet means providing an initial bias against movement of said pointer upscale,
hairspring means affixed at one end to said arbor,
a stop, said hairspring means engaging said stop for automatically increasing said bias when said pointer reaches a predetermined intermediate upscale position, and
a coil for setting up flux incident to current flow therethrough and disposed for reaction of said flux with one of said magnets for driving said pointer upscale first against said initial bias and then against said increased bias.

8. The electric measuring instrument defined in claim 7 further comprising:
an arm to be freely mounted on said arbor, the other end of said hairspring means being affixed to said arbor,
said arm engaging said stop.

9. The electric measuring instrument defined in claim 7 wherein when flow of current is terminated the pointer moves downscale to its intermediate position under the influence of said hairspring means and said control magnet means and from said intermediate position to its initial position under the influence of said control magnet means.

10. The electric measuring instrument defined in claim 7 further comprising:
an element extending radially outwardly from the arbor and free to turn thereabout, said hairspring means being anchored to said element, and
a stationary abutment positioned to engage said element and arrest the same when the pointer reaches the predetermined intermediate upscale position.

11. In an electric measuring instrument,
a casing,
a dial face,
rockably mounted arbor means,
permanent magnets mounted upon said arbor means and rendering the same astatic,
a pointer mounted upon said arbor means and adapted for being swung thereby over said dial face,
control magnet means providing a predetermined bias against movement of said pointer in one direction from an initial position,
hairspring means providing a different bias against movement of said pointer in the opposite direction from said initial position, and
a coil for setting up flux incident to current flow therethrough and disposed for reaction of said flux with one of said magnets for driving said pointer away from said initial position, the direction of movement being dependent upon the direction of current flow through said coil.

12. In an electric measuring instrument, a casing, a dial face, a pair of arbors, permanent magnet discs magnetically coupling said arbors for being rocked in unison and rendering the same astatic, a pointer mounted upon a first one of said arbors and adapted for being swung thereby over said dial face, means yieldably biasing said pointer against movement in one direction from an initial position, a coil for setting up flux incident to current flow therethrough and disposed for reaction of said flux with one of said magnets for driving said pointer in said one direction against said bias, and stop means for terminating movement of the second one of said arbors when the same is returned under the influence of said bias to said initial position, said pointer being adapted for being driven in the opposite direction against the mutual attraction of said magnets by the reaction of said one magnet to flux set up by said coil incident to increased current flow in the reverse direction.

13. In an electric measuring instrument,
a casing,
a dial face,
a rockably mounted arbor,
permanent magnet discs mounted upon said arbor and rendering the same astatic,
a pointer mounted upon said arbor and adapted for being swung thereby over said dial face,
control magnet means yieldably biasing said pointer against movement in one direction and in the opposite direction from an initial position,
hairspring means yieldably biasing said pointer against movement in said opposite direction from said initial position, the total bias in said opposite direction being greater than that in the first mentioned direction due to the combined effect of said control magnet means and said hairspring means, and
a coil for setting up flux incident to current flow therethrough and disposed for reaction of said flux with one of said magnets for driving said pointer away from said initial position, the direction of movement being dependent upon the direction of current flow through said coil.

References Cited

UNITED STATES PATENTS

| | | | |
|---|---|---|---|
| 2,954,526 | 9/1960 | Pfeffer et al. | 324—146 |
| 3,049,668 | 8/1962 | Borell | 324—132 |
| 3,114,879 | 12/1963 | Medlar | 324—125 |

FOREIGN PATENTS 9,351  4/1907  Great Britain.

RUDOLPH V. ROLINEC, *Primary Examiner.*

G. R. STRECKER, *Assistant Examiner.*

U.S. Cl. X.R.

324—131, 132